United States Patent
Wu

(10) Patent No.: US 8,260,301 B2
(45) Date of Patent: Sep. 4, 2012

(54) METHOD AND SYSTEM FOR IMPLEMENTING TERMINAL HANDOVER

(75) Inventor: Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1120 days.

(21) Appl. No.: 12/127,128

(22) Filed: May 27, 2008

(65) Prior Publication Data

US 2008/0227457 A1 Sep. 18, 2008

Related U.S. Application Data

(63) Continuation of application No. PCT/CN2006/003198, filed on Nov. 28, 2006.

(30) Foreign Application Priority Data

Nov. 28, 2005 (CN) .......................... 2005 1 0124057

(51) Int. Cl.
G06F 15/16 (2006.01)
(52) U.S. Cl. ....................... 455/437; 455/442
(58) Field of Classification Search .................. 455/436, 455/437, 442; 370/331, 332
See application file for complete search history.

(56) References Cited

U.S. PATENT DOCUMENTS

| | | | |
|---|---|---|---|
| 6,108,519 | A | 8/2000 | Nitta |
| 7,103,028 | B1 | 9/2006 | Yasue et al. |
| 2004/0180687 | A1* | 9/2004 | Ahn et al. ............ 455/522 |
| 2011/0014941 | A1* | 1/2011 | Matsunaga ............ 455/525 |

FOREIGN PATENT DOCUMENTS

| | | |
|---|---|---|
| CN | 1200007 A | 11/1998 |
| CN | 1243370 A | 2/2000 |
| CN | 1376372 A | 10/2002 |
| CN | 1409518 A | 4/2003 |
| CN | 1160995 C | 8/2004 |
| CN | 1571292 A | 1/2005 |
| JP | 2001-061174 A | 3/2001 |

OTHER PUBLICATIONS

Written Opinion of the International Searching Authority in corresponding PCT Application No. PCT/CN2006/003198 (Mar. 15, 2007).
International Search Report in corresponding PCT Application No. PCT/CN2006/003198 (Mar. 15, 2007).
1st Office Action in corresponding Chinese Application No. 200510124057.3 (Mar. 6, 2009).

(Continued)

Primary Examiner — Sam Bhattacharya
(74) Attorney, Agent, or Firm — Leydig, Voit & Mayer, Ltd.

(57) ABSTRACT

A method and system for implementing terminal handover, the method include: receiving, by a serving handover (HO) function unit, a handover instruction from a network element on network; and implementing, by the serving HO function unit, the handover for the terminal in accordance with the handover instruction, and handing over the terminal to a target base station (BS). With the disclosure, the terminal handover flow can be triggered by the network, and the problems of the inefficient terminal handover or the high network resource consumption and the handover delay in the prior art can be overcome.

17 Claims, 4 Drawing Sheets

OTHER PUBLICATIONS

"Std 802.16e—Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Standard for Local and metropolitan area networks, Feb. 28, 2006, Institute for Electric and Electronic Engineers, New York, New York.

"WiMAX End-to-End Network Systems Architecture," Stage 2: Architecture Tenets, Reference Model and Reference Points, Dec. 15, 2005, Draft, WiMAX, Beaverton, Oregon.

* cited by examiner

METHOD AND SYSTEM FOR IMPLEMENTING TERMINAL HANDOVER

The present application is a continuation of International Patent Application No. PCT/CN2006/003198, filed Nov. 28, 2006, which claims priority to Chinese Patent Application No. 200510124057.3, filed on Nov. 28, 2005, entitled "Terminal Handover Method and System", both of which are hereby incorporated by reference in their entirety.

FIELD OF THE INVENTION

The present invention relates to the communication field, and more particularly to method and system for implementing terminal handover.

BACKGROUND

A wireless metropolitan area network standard for the fixed broadband wireless access (BWA) is defined by the IEEE 802.16 protocol. The standard defines different physical layer techniques for different frequency bands. The standard is mainly applied in home, small office/home office (SOHO), remote worker, and small enterprise (SME).

The IEEE 802.16 MAC is capable of supporting a network environment with hundreds of subscriber terminals on each channel, and supporting continuous traffic and burst traffic.

However, when the number of the network terminals to be served simultaneously is large, it would easily cause an uneven load to the network side equipment or an uneven resource distribution, and the communication quality of the terminals would be influenced if serious. Therefore, the terminals should be handed over between different equipment on the network providing the same service, so as to balance the load or resource of the network side equipment, thereby improving the service quality of the network.

As shown in FIG. 1, the common terminal handover process with a centralized control manner requires the following three steps (the base station serving node (BSSN) in the Figure is the access service network gateway (ASN-GW) below. The process can be described by ASN-GW.).

(1) A mobile subscriber station (MS) communicates with a current serving base station (BS), i.e. the BS in the middle on the left side of FIG. 1, via an air interface, and the current serving BS communicates with a current serving ASN-GW1, i.e. the BSSN1, as shown by line (1).

(2) After the MS is handed over, the MS communicates with a target BS, i.e. the BS at the lower part on the left side of FIG. 1. Assuming that the target BS and the current serving BS communicate with the same ASN-GW1, then only the interface R6 should be migrated, and the interface R3 remains unchanged during the handover process, as shown by line (2).

(3) After the MS is handed over, the MS communicates with the target BS. If the target BS communicates with a target ASN-GW2, the original interfaces R6 and R3 should be migrated. The signaling interfaces from the core network to the terminal must be migrated to the target ASN-GW2 after the step (2), and the interfaces involved include R3, R4, and R6;

(4) After the MS handover is performed, the signaling interfaces with the core network are entirely migrated to the target BS and the target ASN-GW2. The path is shown by line (3) in the Figure.

In the above network structure, the BS generally includes logic function units such as a media access control (MAC) and physical layer (PHY) unit, a service flow management (SFM) unit, and an HO function unit.

The ASN-GW generally includes function units such as an authenticator, an MIP client, a foreign agent (FA), a paging controller (PC), a service flow authorization, and a relaying HO function unit.

Referring to FIG. 2, a conventional terminal handover control process is shown. Handover interactions occur between a Serving HO function, the Relaying HO function, and a Target HO Function, and the HO Function is used to control the whole handover operation and the signaling process related to the handover.

During the handover, a terminal initiates a terminal handover request to the current serving BS at first. Upon receiving the air interface message, and an HO Function (i.e. the Serving HO Function) unit in the serving BS is triggered to initiate a handover request. The handover request is forwarded to the Target HO Function unit via a BSSN (having the Relay HO Function unit therein) between the serving BS and the target BS, so as to implement the handover interactions.

The HO Request message is used for the Serving HO Function unit to initiate a handover request to the Target HO Function unit, and the HO Response message is used for the Target HO Function unit to return a handover response to the Serving HO Function unit.

The interaction of the HO Request message and the HO Response message enables the network to prepare a corresponding target BS list for the terminal handover, and send it to the terminal.

The HO Confirm message is used for the serving BS to inform the target BS to get ready for the handover via a backbone network, after the terminal makes a handover instruction formally and sends it to the serving BS.

The above scheme can not support the handover initiated by the BSSN or by the network, and can only support the handover initiated by the terminal, and therefore, the BSSN triggering a terminal handover based on the requirement for the resource or load balance cannot be realized.

An improved scheme is that, the BSSN determines directly the terminal to be handed over, and makes the terminal send directly a handover request to a target BSSN or a target BS. However, it assumes that the BSSN know the wireless channel condition of all terminals thereof, and know the load condition between every two BSs thereof. Therefore, since the BSSN does not know the real operation conditions of the terminal and the network side equipment, the terminal handover may not be performed effectively. Or, it should cost much to get knowledge of the real operation conditions of the terminal and the network side equipment, which causes high resource consumption of the terminal handover, and causes handover delay.

SUMMARY

The present invention provides a terminal handover method and a base station (BS) and network system for implementing the terminal handover, for overcoming the problems of the inefficient terminal handover or the high network resource consumption and the handover delay in the prior art.

The method of the present invention includes:

A terminal handover method includes:

A network element on network triggers a terminal handover process, sends a handover instruction to a serving HO function unit, and instructs the serving HO function unit to implement a handover for its controlled MS;

the serving HO function unit implements the terminal handover operation in accordance with the handover instruction, and hands over the terminal to a target BS.

A BS for implementing the terminal handover provided by the present invention is provided with a serving HO function unit therein, and further includes a handover triggering unit.

The handover triggering unit is located on the network, and configured to trigger a terminal handover process, send a handover instruction to a serving HO function unit, and instruct the serving HO function unit to implement a handover for its controlled terminals. The serving HO function unit implements a terminal handover operation in accordance with the handover instruction, and hands over the terminal to a target BS.

A network system for implementing terminal handover provided by the present invention includes a BS with a serving HO function unit, and further includes a handover triggering unit.

The handover trigger unit is located on the network, and configured to trigger a terminal handover process, send a handover instruction to the serving HO function unit, and instruct the serving HO function unit to implement a handover for its controlled MS. The serving HO function unit implements a terminal handover operation in accordance with the handover instruction, and hands over the terminal to a target BS.

With the present invention, by adding a scheme for initiating a handover triggering message by the network, a terminal handover flow may be triggered by the network, thereby overcoming the shortage of only the terminal initiating the handover flow in the prior art, and improving the handover flow scheme.

With the present invention, by initiating a handover triggering flow by the network, the network can implement a terminal handover in accordance with the load balance stored thereon, the signal intensity adjustment, or the signal quality adjustment, so as to accelerate the terminal handover speed and make the handover consumes less resource, thereby enriching the network management content to reasonably use the network resource.

BRIEF DESCRIPTION OF THE DRAWING(S)

DETAILED DESCRIPTION

The detailed description of the present invention is given in combination with the accompanying drawings below.

Figure 7:
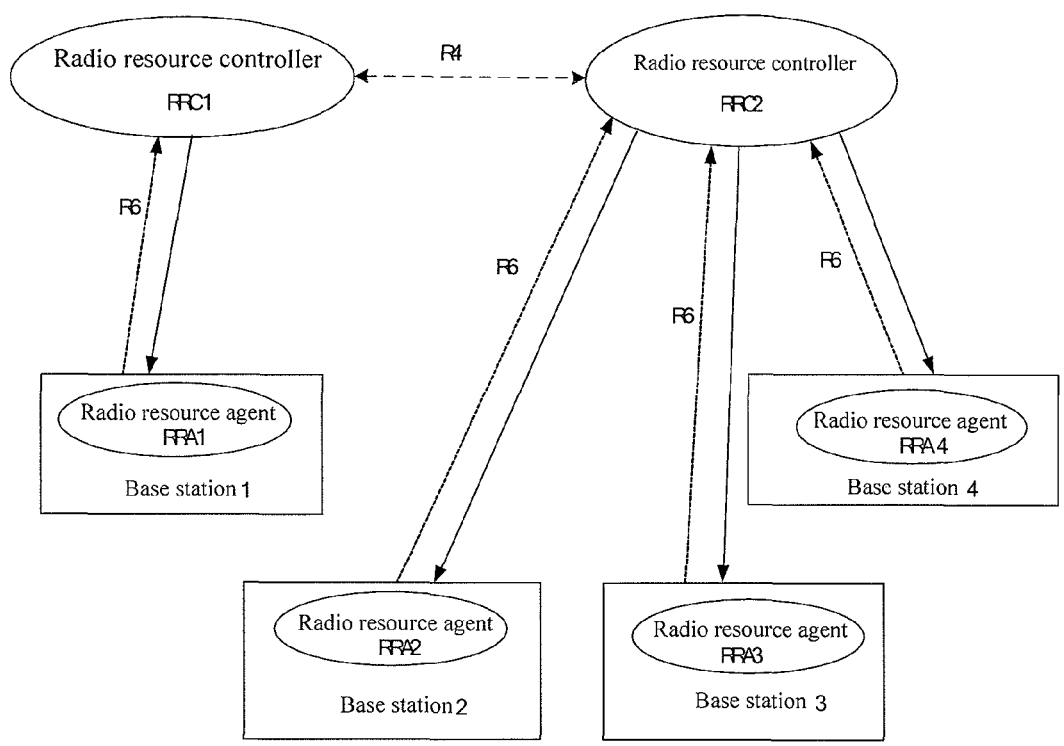
FIG. 7 is an exemplary diagram of a network structure for implementing the embodiments of the present invention.

The embodiments of the present invention may be achieved based on many network structures. For example, in a worldwide interoperability microwave access (WiMAX) network, the Radio Resource Management (RRM) mode mainly includes two function entities, namely, a Radio Resource Agent (RRA) and a Radio Resource Controller (RRC). According to different positions of the RRA and the RRC in an actual network, different network structures may be formed. With a network structure shown in FIG. 7 as an example, the structure on which the embodiments of the present invention is based is that, the RRAs are located in the base station (BS), and responsible for managing and controlling the local radio resource, such as the admission control, power control, scheduling control, and handover control in the BS, in addition to collecting the information of the local radio resource, and communicating with the RRCs. The RRCs are located in the ASN GWs or arranged separately, and responsible for managing a multi-BS RRM algorithm, managing and controlling the multi-cell load balance and inter-cell handover through the radio resource information reported by the RRAs. The RRCs are connected via an interface R4, and the RRCs and the RRAs are connected via an interface R6. When a handover is initiated by the network, the RRC would require a corresponding BS to handover the MS in accordance with the multi-cell load balance algorithm or other triggering condition. The RRC may select how much load to be handed over by the BS, may require the BS to handover some designated MSs, and may also require the BS to handover some designated MSs to some designated target BSs, in accordance with the resource conditions it holds (related to the resource condition of the present BS reported by the RRAs, the resource information of neighboring BSs interacted between the RRCs).

Figure 6:
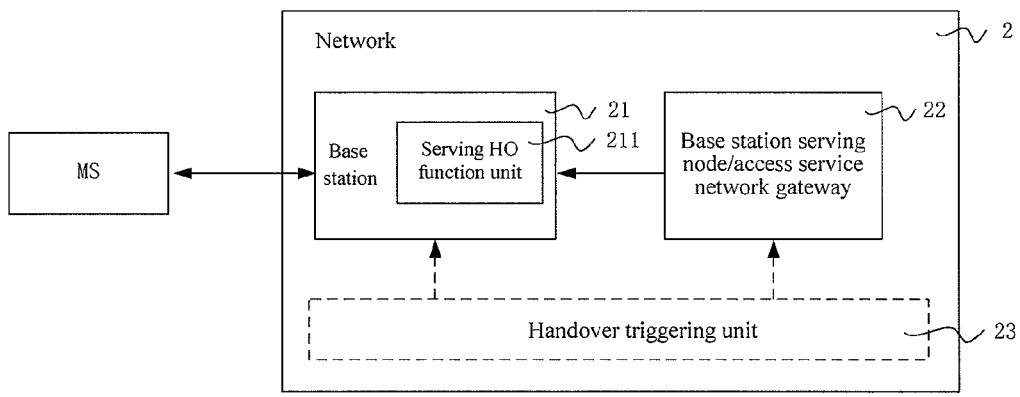
FIG. 6 is a structural view of an embodiment of a network system for implementing the terminal handover according to the present invention.

As shown in FIG. 6, it is a structural diagram of an embodiment of a network system for implementing the terminal handover according to the present invention. The system described in FIG. 6 includes a terminal 1 and a network 2 providing an access service to the terminal 1. The equipment on the network 2 include a BS 21 and a base station serving node (BSSN) (or an access service network gateway) 22. The BS 21 is configured with a serving handover (HO) function unit 211.

The equipment on the network further includes a handover triggering unit 23 configured to trigger a terminal handover process, send a handover instruction to the serving HO function unit 211 in the BS 21, and require the serving HO function unit 211 to implement a handover for its controlled MS in accordance with the handover instruction. The serving HO function unit 211 implements the terminal handover operation in accordance with the handover instruction, and hands over the terminal to a target BS.

The specific position of the handover triggering unit 23 on the network can be flexibly located. For example, it can be arranged on the BS, and specifically, on one of the following function units of the BS: a message processing unit, a radio resource controller unit, and a wireless signal measurement control unit.

If the handover triggering unit is arranged on the BS, the BS includes a handover triggering unit in addition to the serving HO function unit, the handover triggering unit is configured to trigger a terminal handover process, send a handover instruction to the serving HO function unit, and instruct the serving HO function unit to implement a handover for its controlled terminals. The serving HO function unit implements a terminal handover operation in accordance with the handover instruction, and hands over the terminal to a target BS.

The specific position of the handover triggering unit 23 on the network may not be limited to the BS. For example, it may be arranged on the network resource manager. The network resource manager is located in one of the following network elements: a BS controller, a BSSN, and an access service network gateway.

Figure 1:
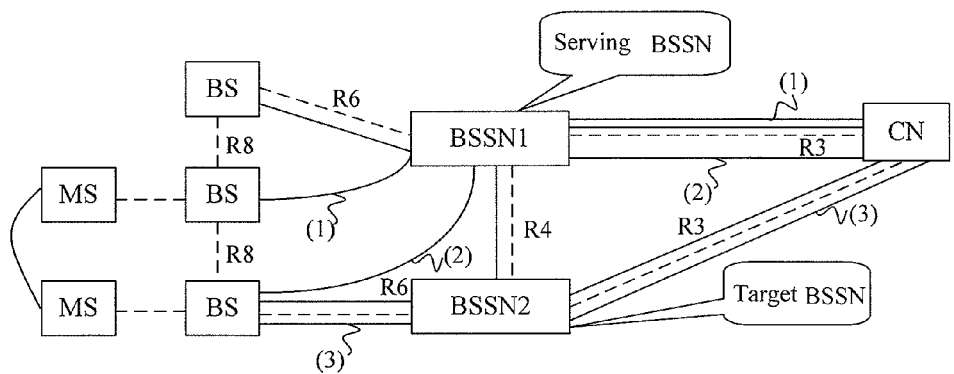
FIG. 1 is a schematic diagram of a terminal handover process.
Figure 2:
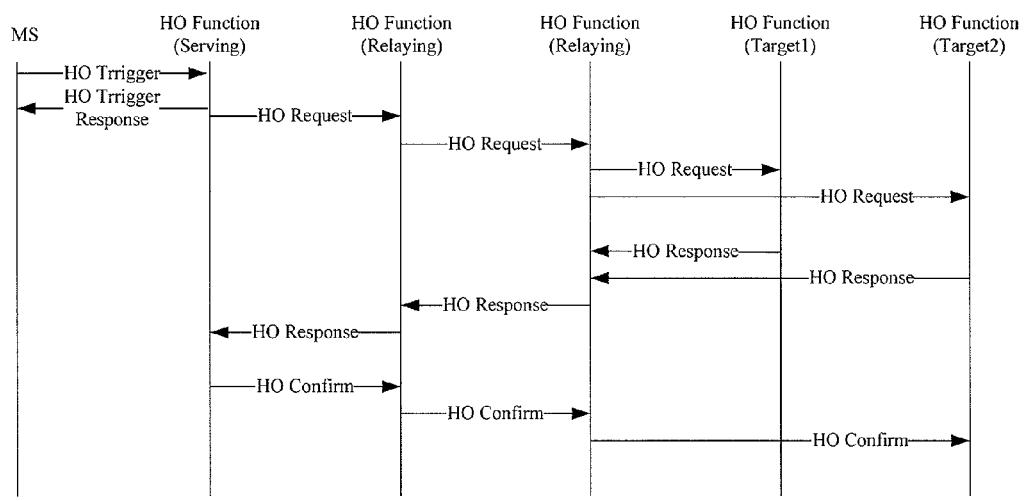
FIG. 2 is a flow chart of the terminal handover.
Figure 3:
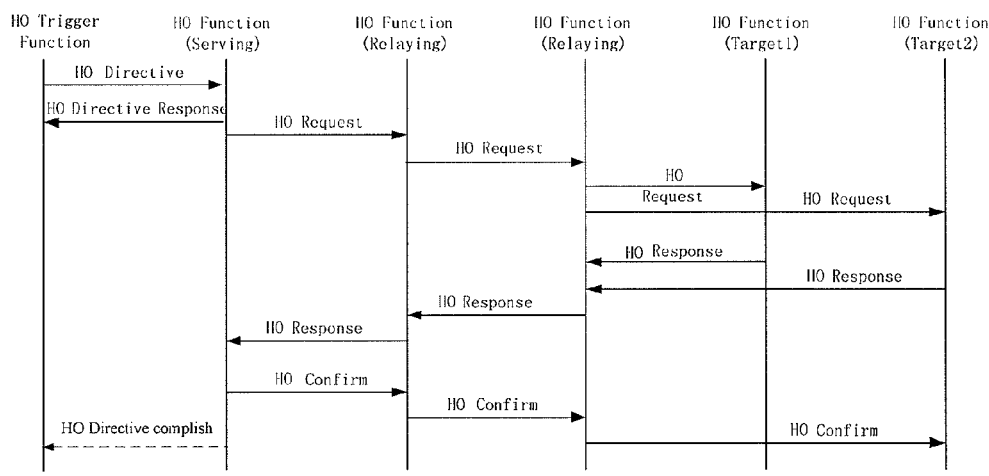
FIG. 3 is a flow chart of an embodiment of the network initiating the terminal handover according to the present invention.

FIG. 3 is a flowchart of an embodiment of the network initiating a terminal handover according to the present invention, which includes the following steps.

1. The handover triggering unit initiates a handover instruction to the serving HO function unit (generally in the BS) in accordance with the network condition such as the load balance requirement of the network equipment, instructs the serving HO function unit in the selected BS to handover some or a number of MSs or handover a corresponding amount of load.

2. Upon receiving the handover instruction, the serving HO function unit determines whether it can handle or not, and if yes, returns a handover response to the handover triggering unit, indicating it is processing the handover; otherwise, returns a rejection.

3. The serving HO function unit selects a proper MS for handover, in accordance with its resource condition and the service, resource, and signal environment of the MS in the current BS. If the current BS of the MS has no necessary information such as the signal environment information of the MS, a scan operation instruction can be initiated to the MS, requiring the MS to scan the neighboring BSs and report the result. After selecting the MS, the serving HO function unit initiates a handover request to a target HO function unit for each MS. The request carries MS information, service information, link information, and the like. The request may need to be forwarded to a target HO function unit via a plurality of relay HO function units. The handover request can be sent to a plurality of target HO function units, in order to select a best target HO function unit from a plurality of targets.

4. Upon receiving the handover request message, the target HO function unit determines whether the MS requirement can be satisfied in accordance with the information and service requirement of the hands overed MS, and if so, returns a handover response. The target HO function unit may also make some necessary preparations for the MS to be handed over, for example, pre-establishing a data path, assigning the initial resource, and the like. If not, it returns a rejection response. The handover response message may need to be forwarded to the serving HO function unit via a plurality of relay HO function units.

5. Upon receiving the responses of each target HO function unit, the serving HO function unit selects one or more proper BSs that meet the requirement as a handover target BS of the MS in accordance with the response content, and sends a handover request to the MS, requiring the MS to be handed over to one of the designated target BSs. After selecting the target BS, the MS performs the handover operation, and sends a handover instruction to the serving HO function unit. The instruction carries the target BS to which the MS is to be handed over. Upon receiving the instruction, the serving HO function unit sends a handover confirmation to a handover target function unit designated by the MS, confirming that the MS would be handed over to the BS thereof.

In the above steps 3 to 5, the serving HO function unit would implement one handover processes for each MS to be handed over of the present BS, and may also implement the handover process for many MSs in one operation (in this case, it generally requires that, the handover service function has determined that a plurality of MSs are handed over to the same target HO function unit or BS), until the requirement of the HO Directive is met, or due to some reasons (e.g., there is no suitable neighboring BSs for handing over the MS to, and it may cause the MS to disconnect the network if forcing the handover), the handover can not continue.

6. Upon finishing these handover operations, the serving HO function unit may return an HO Directive Complish to the handover triggering unit, and return information about whether it is successful or not in accordance with the actual handover. This message is an optional message, and the serving HO function unit may also not send this message.

In accordance with the differences of the specific positions of the handover triggering unit 23 on the network, the handover instruction in step 1 may be initiated by the following network elements: the BS, the BSSN, the network administrator, and the access service network gateway.

Further, the handover triggering unit 23 may also be arranged in the function unit of the following network elements:

a message processing unit inside the BS, which processes the terminal handover request message upon receiving the message from the terminal;

a radio resource controller unit inside the BS, which triggers the handover flow based on the load balance principle;

a radio signal measurement control unit inside the BS, which triggers the handover flow based on the signal intensity or the signal quality.

A network resource manager in the BS controller, the BSSN, or the access service network gateway, triggers the handover flow based on the load balance or load control.

In step 1, the content of the terminal handover instruction may also be set, that is, the content of the triggering message HO Directive carrying the terminal handover instruction is set with the following information:

(1) A information element of reason is added in the handover triggering message HO Directive, and the reason content may include, but not limited to, operation maintenance, load balance, or radio signal quality.

(2) A information element of handover type is added in the handover triggering message HO Directive, and the handover type may include, but not limited to, the network triggered handover, the terminal triggered handover, the network resource management unit triggered handover, and the radio resource controller triggered handover.

(3) One or more information elements of MS ID are added in the handover triggering message.

The information element of MS ID, i.e. the terminal identification, is used to identify which terminals are to be handed over.

According to different handover algorithms, the terminal identification may or may not be carried. For example, when the BSSN on the network initiates the handover process, it only informs the BS of the load amount to be handed over, while which terminals to be handed over is determined by the BS itself. The BSSN on the network may determine to handover those terminals with a low subscriber priority directly in accordance with the subscription information of the subscribers, and at this time, the identification of the terminals to be handed over should be carried in the message.

Through carrying the information element of handover initiation reason, the information element of handover type, a information element of terminal handover proportion, and the information element of terminal identification in the handover triggering message, the terminal handover scheme may be enriched, thereby bringing a great convenience for the network management.

(4) Bandwidth resource to be handed over is added in the HO Directive message of the handover triggering message.

For example, when the BSSN on the network initiates the handover, the handover is triggered mostly based on the resource or load balance, and at this time, the BSSN only knows the load condition, but does not know the radio link state of the terminal managed under the BS. Therefore, the BSSN should tell the overloaded BSs how much load need to be handed over, but cannot tell which terminals should be handed over. Therefore, the load amount to be handed over may be carried in the HO Directive message. The load amount may be expressed in the form of n Kbit/s.

(5) A information element of terminal handover proportion is carried in the handover triggering message, and the information element is used to instruct the related units to implement a handover for all its current terminals according to a proportion.

(6) A transaction ID is carried in the terminal handover triggering message for identifying the paired request and response, so as to prevent the inconsistence of the response and the request, thereby guaranteeing the pertinence of the response.

As for a handover triggering message response returned by the serving HO function unit, directed to the terminal handover triggering message HO Directive, a terminal handover triggering message HO Directive Response may be set for the interaction between the handover triggering unit and the serving HO function unit.

Upon receiving the terminal handover triggering message sent by the network, the serving HO function unit should return a handover triggering message response to the unit that sends the terminal handover triggering message. The transaction ID is carried in the response. Therefore, the correspondence between the handover triggering message and the handover triggering message response can be guaranteed.

Upon receiving the terminal handover triggering message, the serving HO function unit may trigger a handover flow in accordance with the content of the message, so as to trigger the terminal to implement a handover. The specific handover process may be processed in the same way with the prior art, and will not be described in detail herein.

The present invention is illustrated through the embodiments in FIGS. 4 and 5 below.

Figure 4:
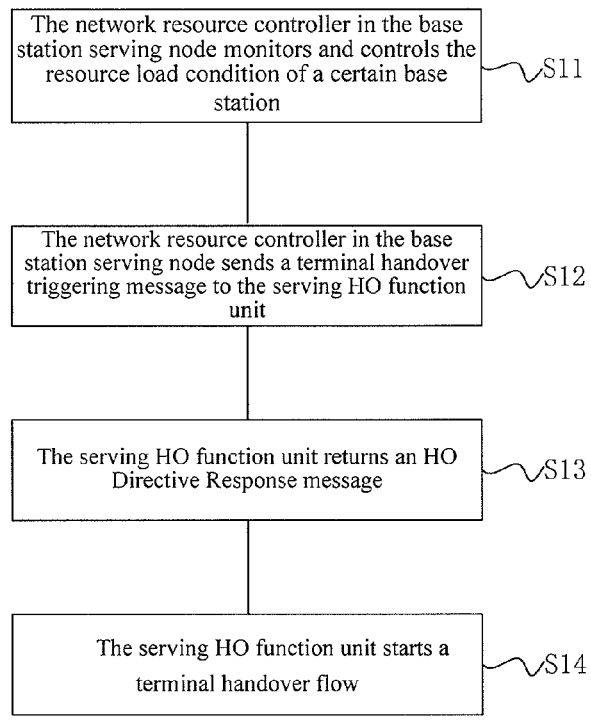
FIG. 4 is a flow chart of an embodiment of a base station serving node (BSSN) initiating the terminal handover.
Figure 5:
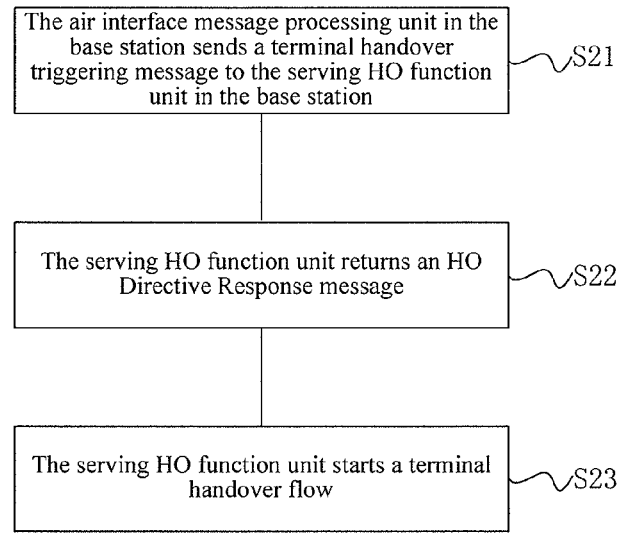
FIG. 5 is a flow chart of an embodiment of a base station (BS) initiating the terminal handover.

The embodiment shown in FIG. 4 illustrates the handover initiated by the BSSN.

In this example, with the BSSN as the function unit for the network initiating the terminal handover triggering request, a terminal handover triggering message is sent to the serving HO function unit, for triggering a terminal handover flow.

In this example, the handover triggering unit 23 is located in the BSSN, as shown by the 22 in FIG. 6. The embodiment shown in FIG. 4 includes the following steps.

In block S11, the network resource controller in the BSSN monitors and controls the resource load condition of a BS.

The network resource controller in the BSSN monitors and controls the resource load condition of a BS, and prepares to trigger a terminal handover flow when it discovers the resource load of the BS in its administration is too heavy.

In block S12, the network resource controller in the BSSN sends a terminal handover triggering message to the serving HO function unit.

At this time, the network resource controller in the BSSN, as a handover triggering logic unit, sends an HO Directive message to the handover function unit in a particular BS to inform the handover function unit to trigger a handover. The bandwidth resource to be handed over is carried in the message, for example, in n Kbit/s. At this time, the handover function unit in the BS exists as a serving HO function unit.

In block S13, the serving HO function unit turns an HO Directive Response message.

Upon receiving the HO Directive message, the serving HO function unit in the BS returns the HO Directive Response message, informing the handover triggering unit that the HO Directive message has been received, and a handover process is initiated and processed subsequently. At the same time, it will select an object terminal to be handed over, which may be one or more terminals, in accordance with the bandwidth resource to the handed over carried in the received HO Directive message, and in accordance with the state (e.g., activated mode, idle mode, sleep mode, and the like) of the terminal managed currently, the subscription level of the terminal, the subscriber priority of the terminal, and the like.

In block S14, the serving HO function unit starts the terminal handover flow.

After selecting the terminal object to be handed over, the serving HO function unit in the BS guides and performs the subsequent handover process in accordance with the prior art.

The embodiment shown in FIG. 4 illustrates the handover initiated by the BS. In this example, with the air interface message processing unit in the BS as a function unit for the network initiating a terminal handover triggering request, a terminal handover triggering message is sent to the serving HO function unit, for triggering a terminal handover flow, as shown in FIG. 5. The handover triggering unit is located in the BS, as shown by the 21 in FIG. 6. The process mainly includes the following steps.

In block S21, the air interface message processing unit in the BS sends a terminal handover triggering message to the serving HO function unit in the BS.

The reasons for the BS initiating the handover may include many aspects. For example, the handover triggering flow can be triggered based on the load balance principle, and also can be triggered based on the signal intensity or signal quality. The handover flow may also be directly triggered in accordance with the receipt of the terminal handover request message sent by the terminal. The example chooses to directly trigger the handover flow upon the BS receiving the terminal handover request message sent by the terminal.

At this time, the air interface message processing unit in the BS, as a handover triggering logic unit, sends an HO Directive message to the handover function unit in the BS, informing the handover function unit to trigger a handover. The message carries the terminal identification, and the content carried in the terminal handover request, such as the identification of the neighboring BSs, and the signal intensity of the neighboring BSs scanned by the terminal. At this time, the handover function unit in the BS exists as a serving HO function unit.

In block S22, the serving HO function unit returns an HO Directive Response message.

Upon receiving the HO Directive message, the serving HO function unit in the BS returns the HO Directive Response message, informing the handover triggering unit that the HO Directive message has been received, and a handover process is initiated and processed subsequently.

In block S23, the serving HO function unit starts a terminal handover flow.

It is apparent that those skilled in the art may make various changes and variations to the present invention without departing from the spirit and scope of the present invention. Therefore, if these changes and variations of the present invention belong to the scope of the claims and the equivalent techniques of the present invention, the present invention is intended to include these changes and variations.

What is claimed is:

1. A method for implementing a terminal handover, comprising:
   receiving, by a serving handover (HO) function unit, a handover instruction from a network element on a network, the handover instruction is configured to instruct the serving HO function unit to implement the terminal handover for at least one terminal; and implementing, by the serving HO function unit, the terminal handover for the at least one terminal in accordance with the handover instruction, and handing over the at least one terminal to a target base station (BS);

wherein the handover instruction carries an information element of terminal handover quantitative proportion; the information element is configured to instruct the serving HO function unit to handover the at least one terminal which is currently in service in light of the terminal handover quantitative proportion.

2. The method according to claim 1, wherein the network element comprises at least one of a BS, a base station serving node, a network management, and an access service network gateway.

3. The method according to claim 1, wherein the handover instruction carries an information element of handover initiation reason.

4. The method according to claim 3, wherein the handover initiation reason comprises at least one of:
operation maintenance, load balance, radio resource management, radio signal intensity, and quality adjustment.

5. The method according to claim 1, wherein the handover instruction carries an information element of handover type.

6. The method according to claim 5, wherein the handover type comprises at least one of the a network triggered handover, a terminal triggered handover, a network resource management unit triggered handover, and a radio resource controller triggered handover.

7. The method according to claim 1, wherein the handover instruction carries an information element of terminal identification.

8. The method according to claim 1, wherein the handover instruction carries an information element of bandwidth resource to be handed over.

9. The method according to claim 1, wherein the terminal to be handed over is selected in accordance with at least one of the following information of the terminal managed by the current serving HO function unit:
a terminal state, a subscription level of the terminal, and a subscriber priority of the terminal.

10. The method according to claim 1, further comprising:
returning, by the serving HO function unit, a handover response to the network element on the network in response to receiving the handover instruction sent by the network element on the network.

11. The method according to claim 10, wherein the handover instruction and the handover response respectively carry a transaction identification for identifying corresponding relationship between the handover instruction and the handover response.

12. The method according to claim 1, wherein the handover instruction comprises information about the number of the terminals, information of designated terminals, or information of a designated amount of load to be handed over by the BS, and the serving HO function unit hands over terminals of a determined number, a designated terminals, or load of the designated amount to the target BS in accordance with the handover instruction.

13. The method according to claim 1, further comprising:
returning, by the serving HO function unit, a handover accomplish message to the network element on network in response to processing the handover instruction initiated by the network element, the handover accomplish message comprising information of operation success or failure.

14. A base station (BS), comprising:
a handover triggering unit, configured to send a handover instruction to a serving handover (HO) function unit, the handover instruction is configured to instruct the serving HO function unit to implement a handover for at least one terminal;

the serving HO function unit, configured to implement the handover for the at least one terminal in accordance with the handover instruction and hand over the at least one terminal to a target BS;

wherein the handover instruction carries an information element of the terminal handover quantitative proportion and the information element is configured to instruct the serving HO function unit to handover the at least one terminal which is currently in service in light of the terminal handover quantitative proportion.

15. The BS according to claim 14, wherein the handover triggering unit is located in one of the following function units of the BS:
a message processing unit, a radio resource controller unit, and a wireless signal measurement control unit.

16. A network system for implementing terminal handover comprising:
a handover triggering unit, located on a network, configured to send a handover instruction to a serving handover (HO) function unit, the handover instruction is configured to instruct the serving HO function unit to implement a handover for at least one terminal;

a base station (BS) with the serving HO function unit, configured to implement the handover for the at least one terminal in accordance with the handover instruction and hand over the at least one terminal to a target BS;

wherein the handover instruction carries an information element of terminal handover quantitative proportion; the information element is configured to instruct the serving HO function unit to handover the at least one terminal which is currently in service in light of the terminal handover quantitative proportion.

17. The system according to claim 16, wherein the handover triggering unit is located in one of the following network elements:
a BS controller, a base station serving node, and an access service network gateway.

* * * * *